United States Patent
Wasson

(10) Patent No.: US 6,686,767 B1
(45) Date of Patent: Feb. 3, 2004

(54) APPARATUS AND METHOD FOR CONTROLLING A THREE-STATE BUS

(75) Inventor: Stephen L. Wasson, Boulder Creek, CA (US)

(73) Assignee: Morphics Technology Inc., Campbell, CA (US)

( * ) Notice: Subject to any disclaimer, the term of this patent is extended or adjusted under 35 U.S.C. 154(b) by 0 days.

(21) Appl. No.: 09/565,653

(22) Filed: May 5, 2000

Related U.S. Application Data

(60) Provisional application No. 60/133,142, filed on May 7, 1999.

(51) Int. Cl.[7] ............................................. H03K 19/177
(52) U.S. Cl. ............................. 326/38; 326/39; 326/40; 326/56; 326/57
(58) Field of Search ......................... 326/38–41, 56–58

(56) References Cited

U.S. PATENT DOCUMENTS

| | | | |
|---|---|---|---|
| 4,935,734 A | 6/1990 | Austin ................... | 340/825.83 |
| 5,841,295 A | * 11/1998 | Kaviani ................... | 326/39 |
| 6,150,838 A | * 11/2000 | Wittig et al. ............... | 326/39 |
| 6,154,050 A | * 11/2000 | Ma et al. ................... | 326/39 |
| 6,433,578 B1 | * 8/2002 | Wasson ................... | 326/38 |

* cited by examiner

*Primary Examiner*—Vibol Tan
(74) *Attorney, Agent, or Firm*—Darby & Darby

(57) ABSTRACT

A signal control circuit includes a set of signal lines that form a data bus. A set of three-state driver columns is connected to the data bus; each three-state driver column is connected to each signal line of the set of signal lines. A programmable synchronous three-state control circuit is connected to the set of three-state driver columns. The programmable synchronous three-state control circuit responds to a control signal and select signals to produce a three-state output enable signal which is applied to a selected three-state driver column of the set of three-state driver columns so as to control data signals on the data bus.

16 Claims, 10 Drawing Sheets

Decoder Truth Table

| Inputs | Outputs |
|---|---|
| ABCD | OE[15:0] |
| 0000 | 0000 0000 0000 0001 |
| 0001 | 0000 0000 0000 0010 |
| 0010 | 0000 0000 0000 0100 |
| 0011 | 0000 0000 0000 1000 |
| 0100 | 0000 0000 0001 0000 |
| 0101 | 0000 0000 0010 0000 |
| 0110 | 0000 0000 0100 0000 |
| 0111 | 0000 0000 1000 0000 |
| 1000 | 0000 0001 0000 0000 |
| 1001 | 0000 0010 0000 0000 |
| 1010 | 0000 0100 0000 0000 |
| 1011 | 0000 1000 0000 0000 |
| 1100 | 0001 0000 0000 0000 |
| 1101 | 0010 0000 0000 0000 |
| 1110 | 0100 0000 0000 0000 |
| 1111 | 1000 0000 0000 0000 |

FIG. 5 w = RQ3 & !RQ2 & !RQ1 & !RQ0 & EN
x = !RQ3 & RQ2 & !RQ1 & !RQ0 & EN
y = !RQ3 & !RQ2 & RQ1 & !RQ0 & EN
z = !RQ3 & !RQ2 & !RQ1 & RQ0 & EN

APPARATUS AND METHOD FOR CONTROLLING A THREE-STATE BUS

This application claims priority to the provisional application bearing serial No. 60/133,142 filed on May 7, 1999.

BRIEF DESCRIPTION OF THE INVENTION

This invention relates generally to the transport of signals in integrated circuits. More particularly, this invention relates to a technique for controlling three-state data buses in an integrated circuit.

BACKGROUND OF THE INVENTION

Integrated circuits are occasionally implemented to support three types of signal states: a digital high state, a digital low state, and a high impedance state. Integrated circuits that support these signal states are sometimes called tri-state or three-state circuits. Existing three-state circuits consume a relatively large amount of power and are susceptible to poor signal integrity. In addition, existing field programmable gate arrays (FPGAs) typically implement homogeneous resources to provide bussing or routing functions. However, bussing or routing functions implemented by homogeneous resources cannot ensure proper bus control timing. For example, as shown in FIG. 1, depending on the routing and actual signal traveling distance, a first output enable signal (OE1) may be too slow to de-assert a bus source 1 and a second output enable signal (OE2) may be too fast to assert a bus source 2, thus, resulting in a bus conflict as shown in the highlighted portion of FIG. 1.

In view of the foregoing, it would be highly desirable to provide an improved and programmable three-state control circuit for controlling a data bus to reduce bus conflicts in an integrated circuit.

SUMMARY OF THE INVENTION

The invention provides a logic device including a programmable synchronous three-state control circuit (PSTCC) for controlling a data bus. The logic device includes a set of signal lines that form a data bus. A set of three-state driver columns is connected to the data bus; each three-state driver column is connected to each signal line of the set of signal lines. A PSTCC is connected to the set of three-state driver columns. The PSTCC responds to control signals and select signals to produce a three-state output enable signal which is applied to a selected three-state driver column of the set of three-state driver columns so as to control data signals on the data bus.

In the preferred embodiment, a PSTCC is embedded in a device. For example, the PSTCC is embedded within a heterogeneous programmable gate array (HPGA) wherein it resides between the unstructured/control array and the structured/datapath array. In such a case, the PSTCC receives control signals from the unstructured array, responds to the control signals in a pre-programmed way, and issues output controls to the structured/datapath array where the output specifically controls a three-state databus within the datapath. In another exemplary embodiment, the PSTCC is embedded within a datapath device such as a programmable datapath array. In this embodiment, control signals are received from an external device, such as a microprocessor or other controller (i.e., a programmed field programmable gate array). The PSTCC responds to the control signals in a pre-programnned way and issues output signals to control a three-state databus in the datapath device.

BRIEF DESCRIPTION OF THE DRAWINGS

FIG. 5 illustrates an exemplary decoder truth table.

DETAILED DESCRIPTION OF THE INVENTION

Figure 1:
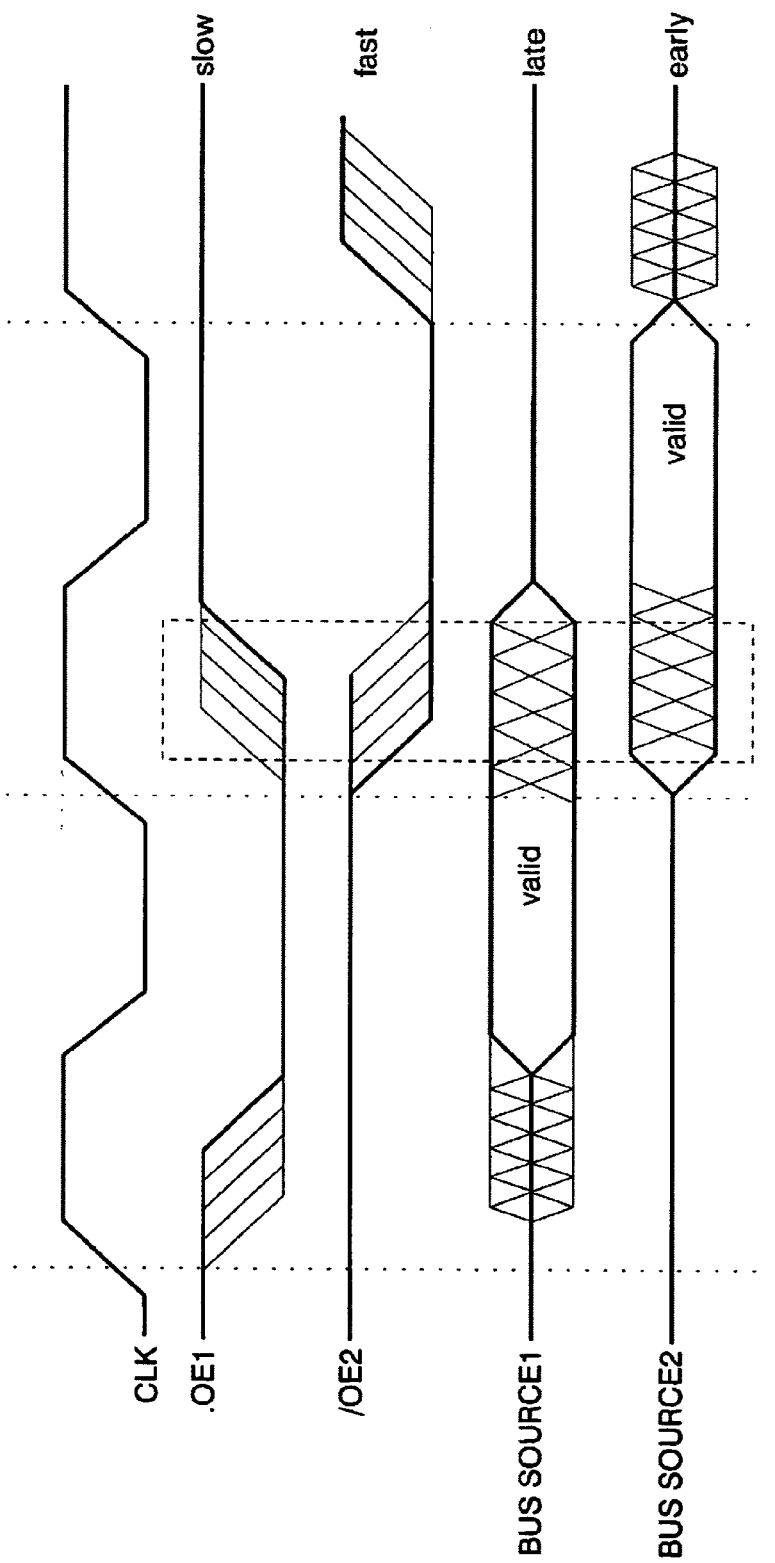
FIG. 1 illustrates an exemplary bus conflict scenario in prior art devices.
Figure 2:
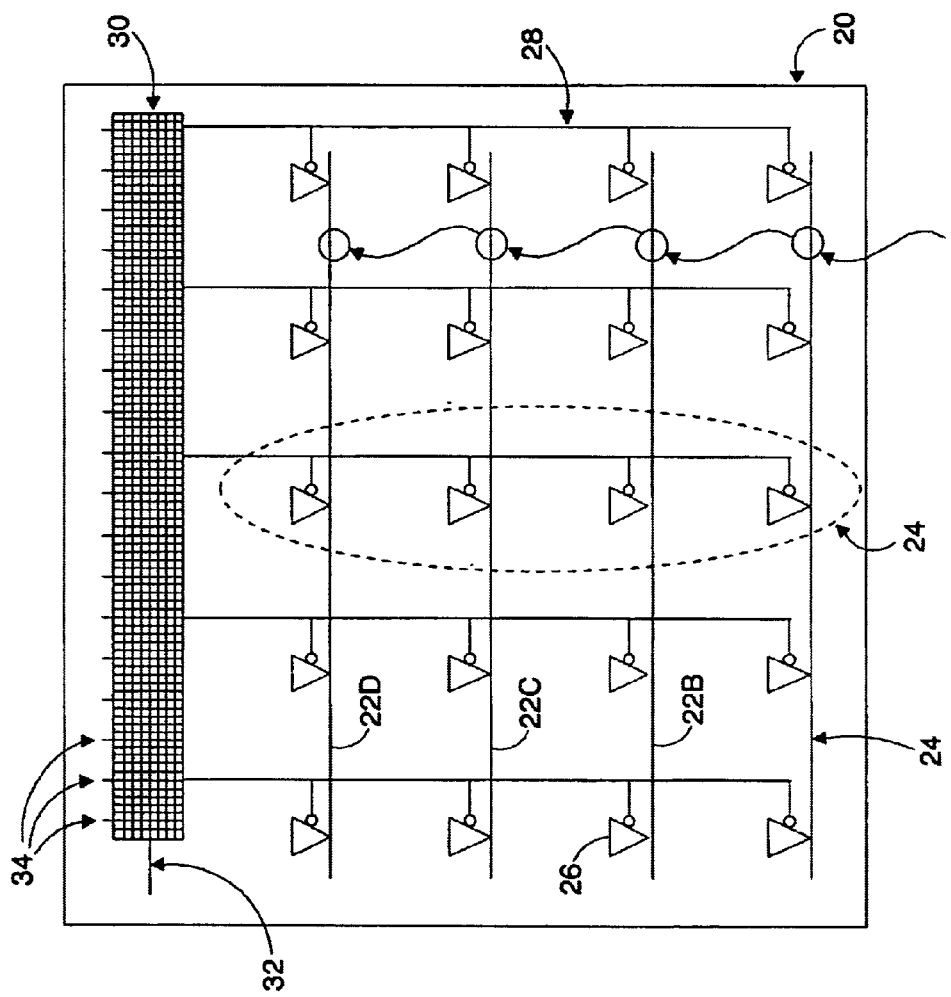
FIG. 2 illustrates an exemplary logic device in accordance with an embodiment of the invention.

FIG. 2 illustrates a logic device 20 including parallel signal lines 22A–22D, which form a bus 23. The logic device 20 also includes three-state driver columns 24, each column includes a set of three-state drivers 26 linked by a three-state enable line 28. A PSTCC 30 has a synchronizing control node 32 to process synchronizing control signals, such as clock inputs. The PSTCC 30 also has three-state select lines 34 to process three-state select signals.

The PSTCC 30 is implemented to eliminate multi-driver bus conflicts. The PSTCC 30 accepts logic inputs, resolves assertion conflicts, and synchronizes three-state driver output enable signals. In an exemplary embodiment, the PSTCC 30 is implemented with programmable logic arrays, such as field programmable gate arrays (FPGAs).

The PSTCC 30, operating in response to control signals on the synchronizing control node 32, accepts and resolves conflicts from the three-state select signals received on the three-state select lines 34 to produce an enable signal on a selected three-state enable line 28. The enable signal selectively enables three-state drivers 26 of the specified three-state driver column 24, thereby controlling data signals on the bus 23 without conflict from three-state drivers 26 of other three-state driver columns 24.

In one embodiment of the invention, each three-state driver column 24 is uniquely addressable through the PSTCC 30. In turn, the PSTCC 30 synchronously enables a single three-state driver column 24. In another embodiment, the PSTCC 30 includes programmable logic that permits user-definable addressing to map physical drivers to user addresses. In yet another embodiment, the PSTCC 30 includes at least one programmable sequencer that is configured to enable more complex three-state enable sequences, such as consecutive enable or back-to-back enable.

Synchronizing and control inputs applied to the synchronizing control node 32 are used to program the PSTCC 30 and to provide one or more synchronous references. The select signals on the select lines 34 are used during operation to specify which three-state enable line 28 to assert. The select lines may or may not be encoded, and output assertion may or may not be on the next synchronous event, depending upon the PSTCC 30 programming.

Figure 3:
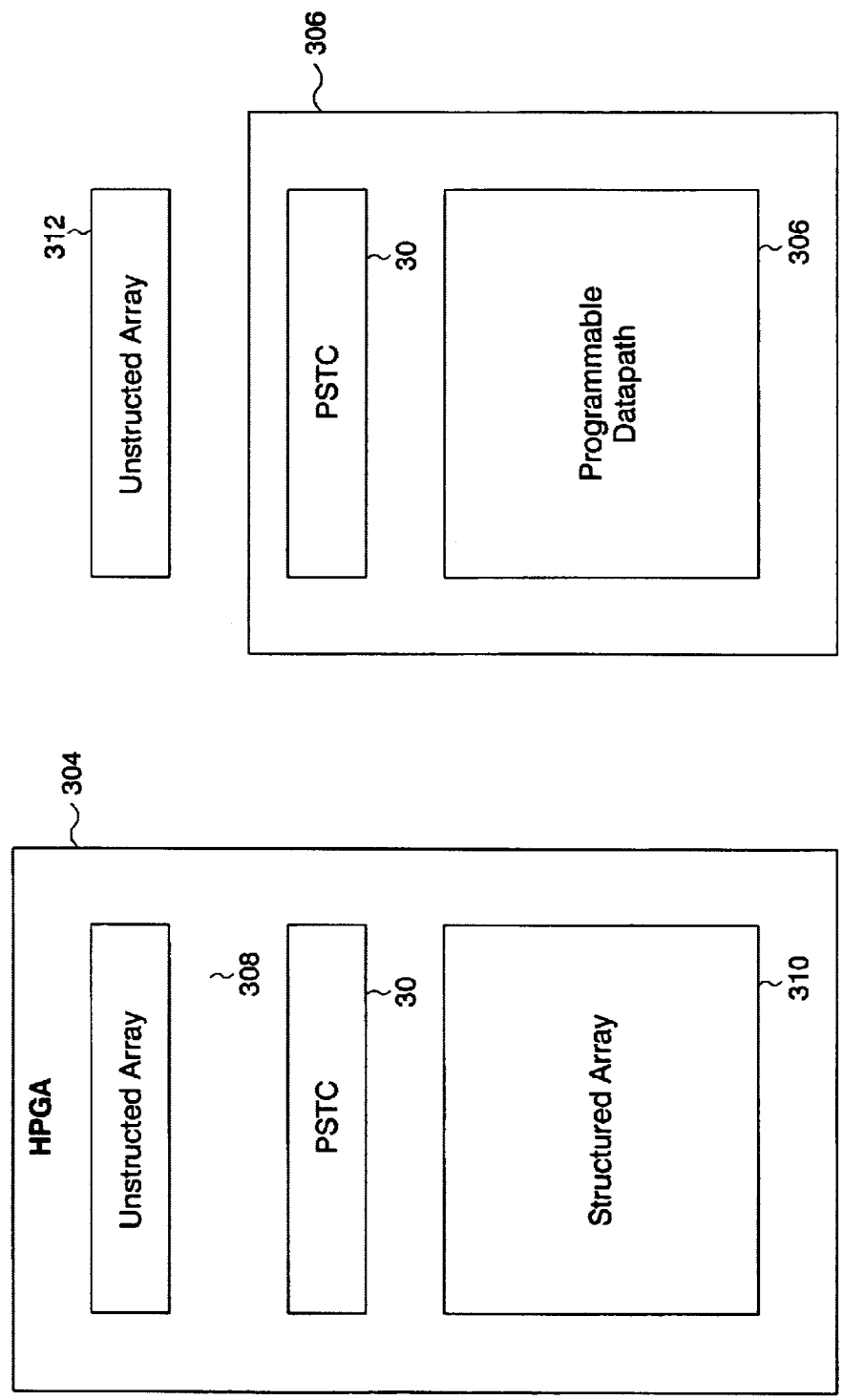
FIG. 3 illustrates an exemplary programmable synchronous three-state control circuit embedded in a HPGA and a programmable datapath array.

FIG. 3 illustrates an exemplary PSTCC 30 embedded in a heterogeneous programmable gate array (HPGA) 304 and a programmable datapath array 306. In an exemplary embodiment, the PSTCC 30, which is embedded within the HPGA 304, resides between an unstructured/control array 308 and a structured/datapath array 310. The PSTCC 30 receives control signals from the unstructured array 308, responds to the control signals in a pre-programmed way, and issues output controls to the structured/datapath array 310 where the output specifically controls a three-state databus within the datapath. In another exemplary embodiment, the PSTCC 30, which is embedded within the programmable datapath array 306, receives control signals from an external controller 312, such as a microprocessor or other controller. In this embodiment, the PSTCC 30 responds to the control signals from the external controller 312 in a pre-programmed way and issues output signals to control a three-state databus within the programmable datapath 314.

Figure 4:
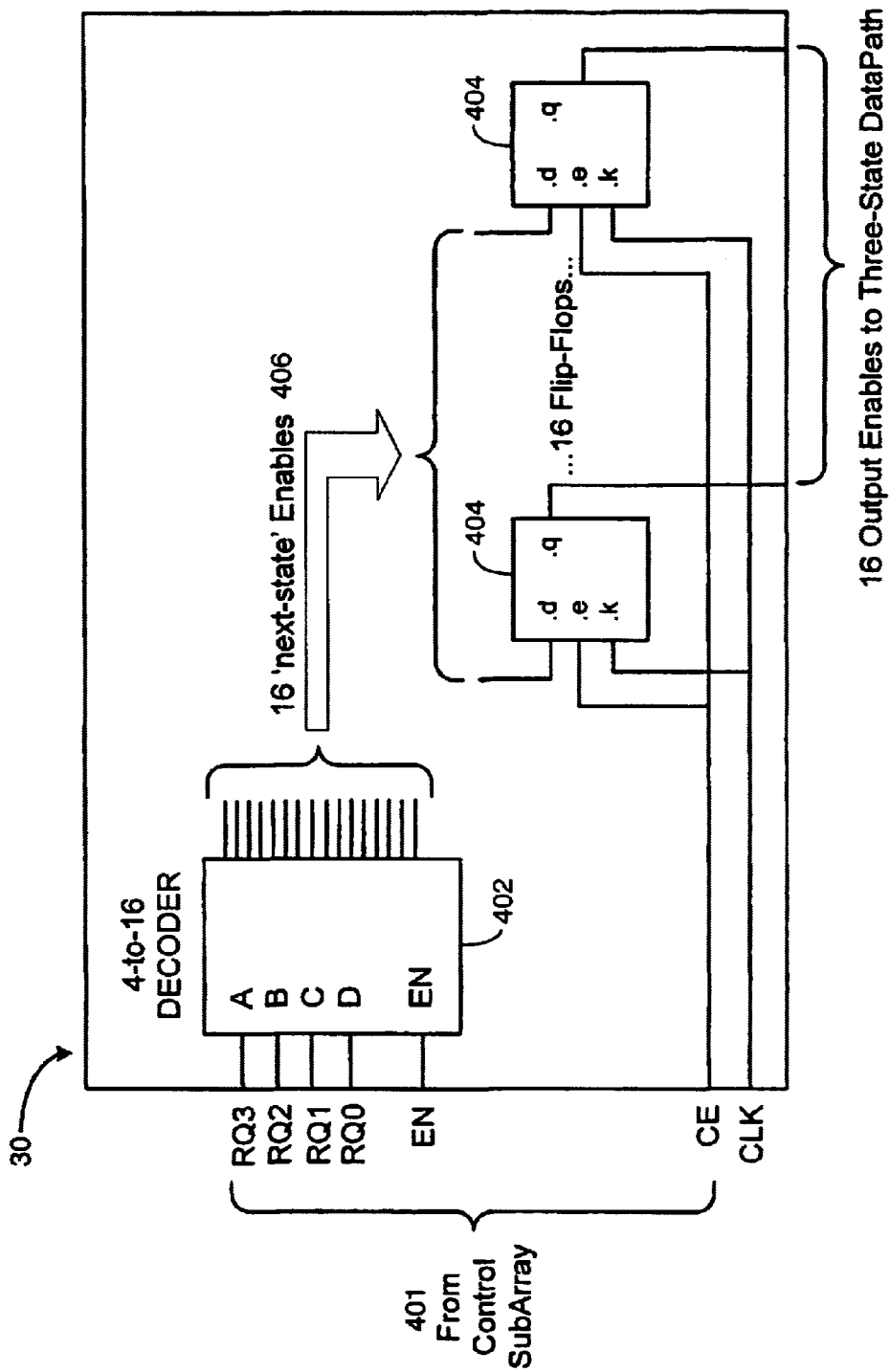
FIG. 4 illustrates an exemplary programmable synchronous three-state control circuit in accordance with an embodiment of the invention.

FIG. 4 illustrates an exemplary PSTCC 30 in accordance with an embodiment of the invention. The PSTCC 30 comprises a decoder 402 and a set of flip-flops 404, such that there is one flip-flop per output enable (OE) signal line from the decoder 402. The decoder 402 accepts column address request signals (RQ0–RQ3) as well as an enable signal (EN) from a control sub-array 401 (not shown). During each clock cycle, the decoder 402 creates next-state enable signals 406 that are applied to the flip-flops 404. The flip-flops 404 are clocked by an input clock (CLK) and a clock enable signal (CE) from the control sub-array 401. In response to the enable signals 406 from the decoder 402, the flip-flops selectively enable a three-state datapath. The decoder 402 makes sure that only one enable signal is decoded and applied to the flip-flops 404. Thus, only one flip-flop 404 is asserted during any one clock period.

FIG. 5 is an exemplary decoder truth table for a 16-bit decoder 402, which may be used in accordance with an embodiment of the invention.

Figure 6:
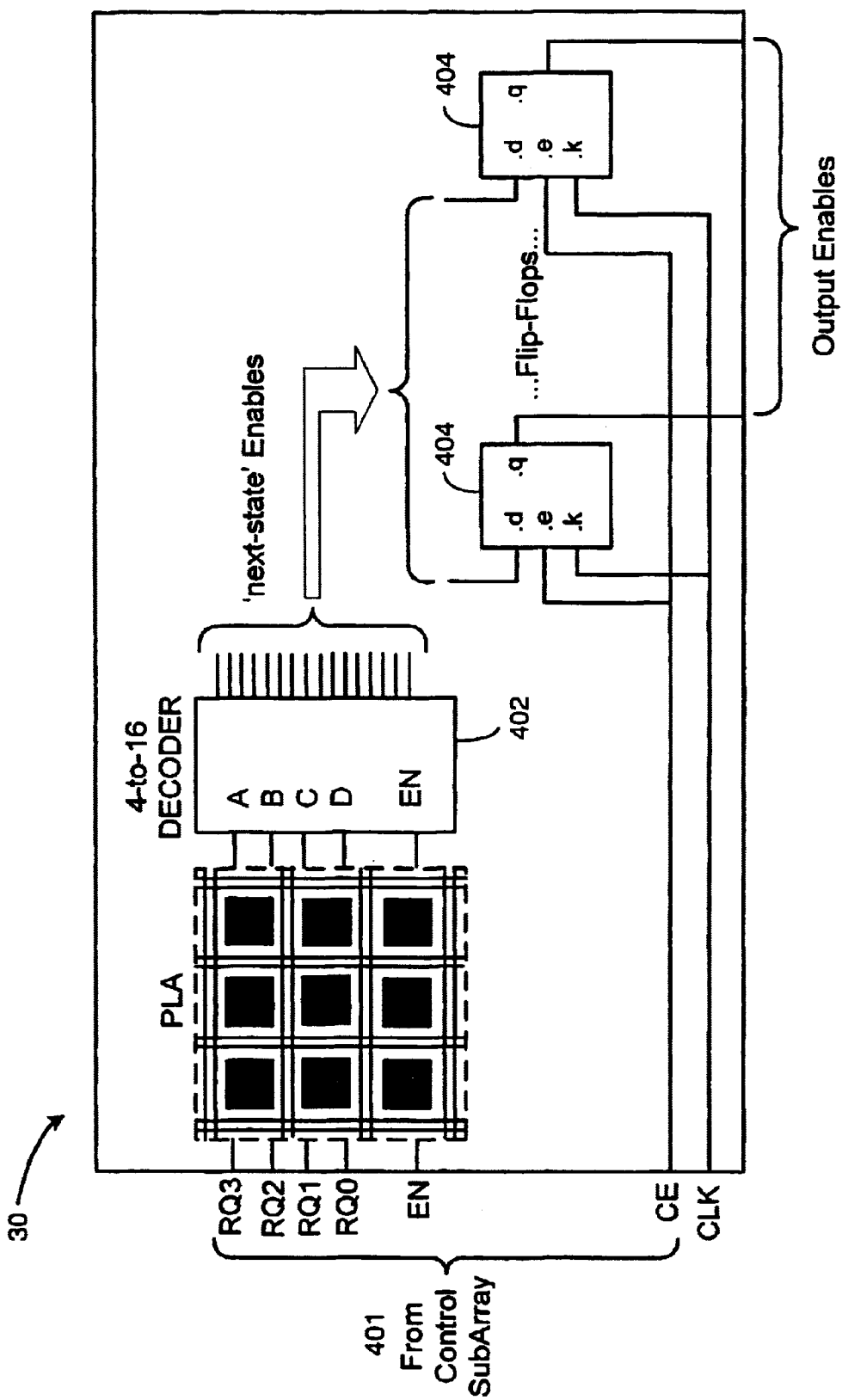
FIG. 6 illustrates another exemplary programmable synchronous three-state control circuit in accordance with an embodiment of the invention.

FIG. 6 illustrates another exemplary PSTCC 30 in accordance with an embodiment of the invention. In this embodiment, the PSTCC 30 includes a set of programmable logic arrays 602, a decoder 402 and flip-flops 404. The programmable logic array 602 may be implemented with various programmable resources, for example, re-programmable fine-grained lookup tables, carry-function generators, flip-flops, general re-programmable routing, and other programmable logic functions. The programmable logic arrays 602 are programmed to perform more complex output request sequences relative to the embodiment described in FIG. 4. In an exemplary embodiment, the programmable logic arrays 602 accept column address request signals (RQ0–RQ3) and an enable signal from a control sub-array 401 (not shown), process the address request signals based on their programmed capabilities, and apply their outputs to the decoder 402. The decoder 402 assures that only one enable signal is decoded and applied to the flip-flops 404, such that only one flip-flop 404 is asserted during a clock period.

Figure 7A:
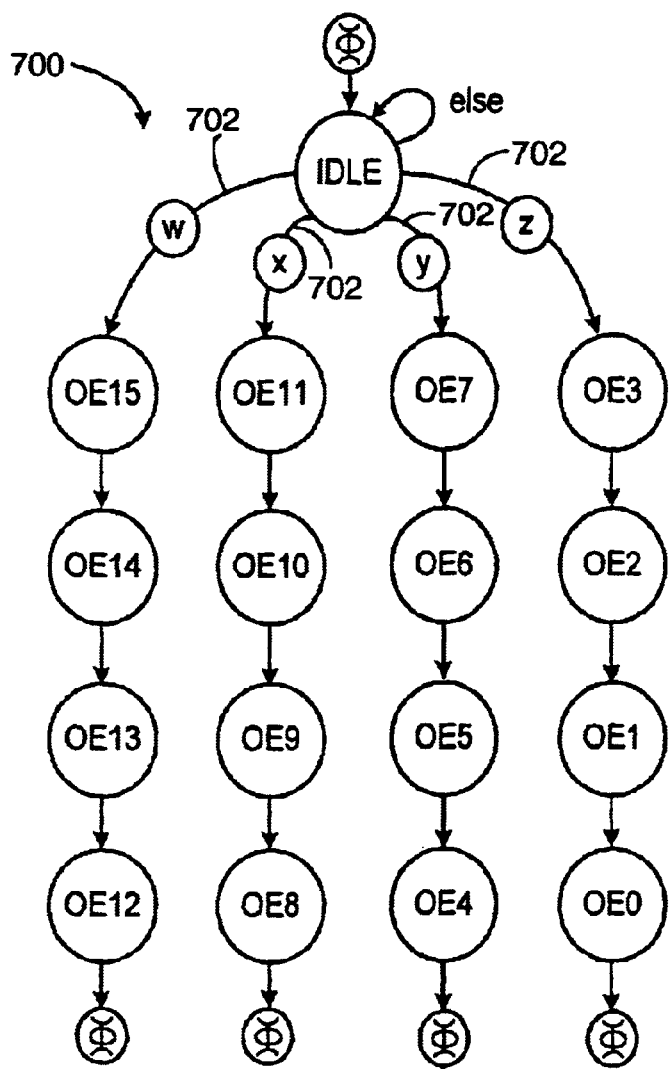
FIG. 7A illustrates an exemplary state diagram in accordance with an embodiment of the invention.

FIG. 7A illustrates an exemplary state diagram 700 that can be implemented by a programmable logic array 602. In the state diagram 700, when a request (RQ) is asserted, a state machine branch 702 is traversed. The traversed branch 702 is contingent upon the input signal states, as shown on the right-hand side of the Figure. Each branch produces four consecutive output enables (OEs), which are subsequently processed by the decoder 402.

Figure 7B:
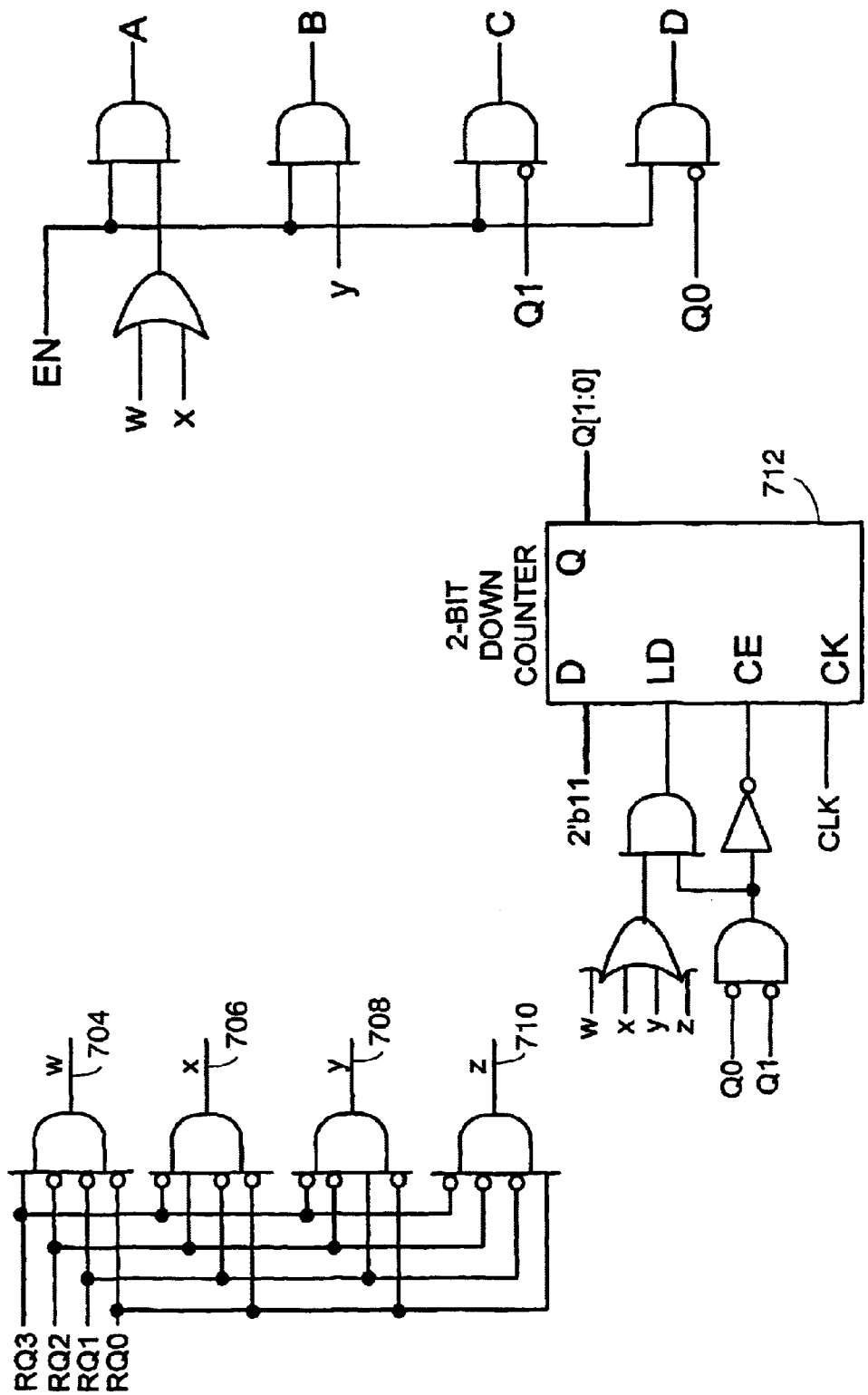
FIG. 7B illustrates an exemplary implementation of a state diagram in accordance with an embodiment of the invention.

FIG. 7B illustrates an exemplary implementation of the state diagram 700 illustrated in FIG. 7A. The state diagram 700 can be reduced to a collection of combinatorial and sequential logic where such logic is then mapped into the programmable logic arrays 602 in FIG. 6. Any change in the state flow to another sequence can be accomplished by reprogramming the programmable logic array 602. In FIG. 7B, if an appropriate request condition is met, then one of the signals w 704, x 706, y 708, or z 710 is asserted. The asserted signal loads a 2-bit down counter 712 with a value that enables the counter 712 to count down. After a specified count, the counter 712 disables itself. If an enable signal (EN) is asserted, the enable signal enables outputs A–D.

Figure 8:
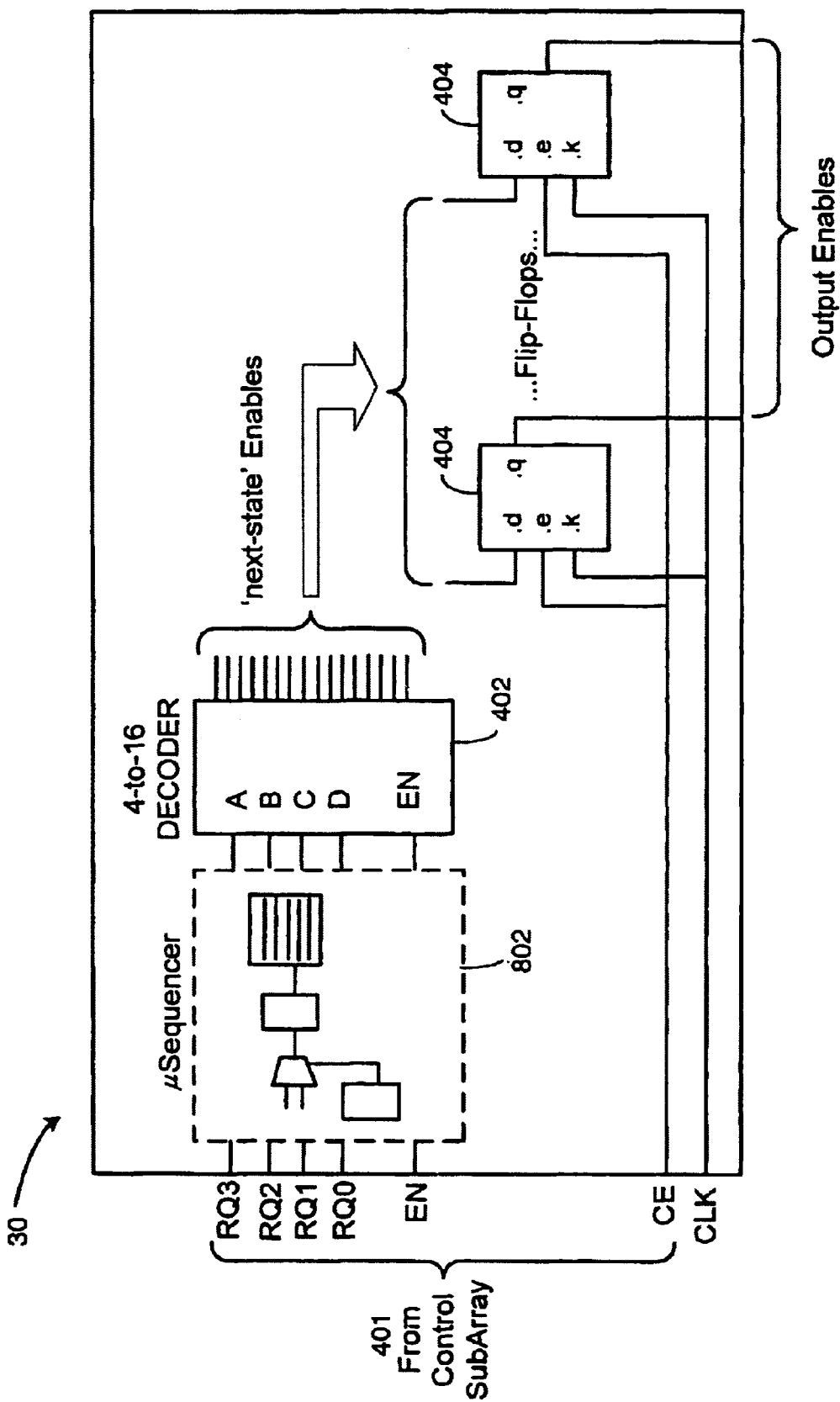
FIG. 8 illustrates another exemplary programmable synchronous three-state control circuit in accordance with an embodiment of the invention.

FIG. 8 illustrates another exemplary PSTCC 30 in accordance with an embodiment of the invention. In this embodiment, the PSTCC includes a microsequencer 802, a decoder 402 and flip-flops 404. The microsequencer 802 is programmed to perform more complex output request sequences relative to the embodiment illustrated in FIG. 4. In an exemplary embodiment, the microsequencer 802 accepts column address request signals (RQ0–RQ3) and an enable signal from a control sub-array 401 (not shown), processes the address request signals based on its programmed capabilities, and applies its outputs to the decoder 402. The decoder 402 assures that only a single enable signal is decoded and applied to the flip-flops 404. The flip-flops 404 assure a synchronous, non-conflicting output.

Figure 9:
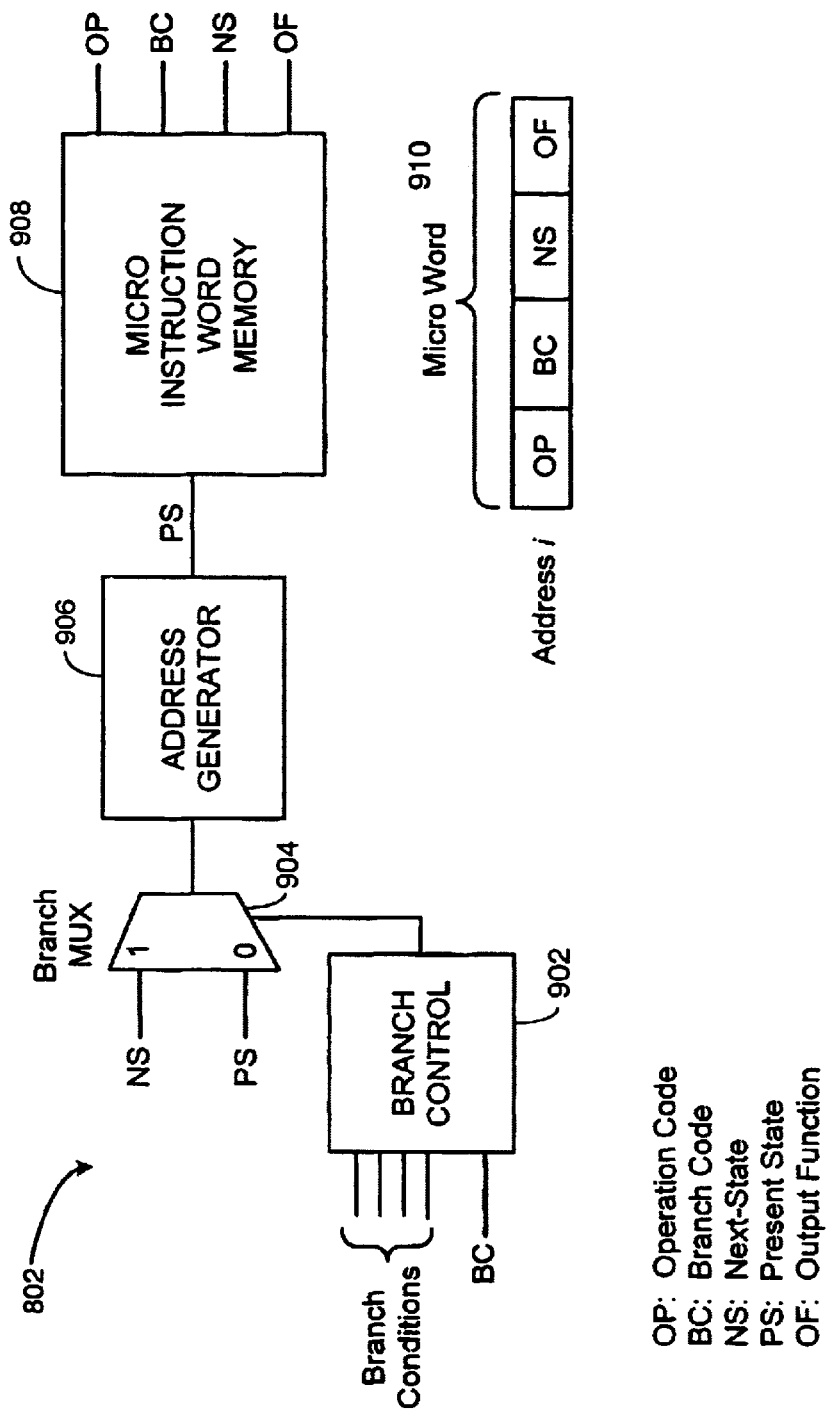
FIG. 9 illustrates an exemplary microsequencer in accordance with an embodiment of the invention.

FIG. 9 illustrates an exemplary microsequencer 802 in accordance with an embodiment of the invention. The microsequencer 802 is programmed to generate inputs to the decoder 402. The microsequencer 802 comprises a branch control 902, a branch multiplexor 904, an address generator 906, and a micro instruction word memory 908. A micro sequence word 910 comprises an operation (OP), a branch code (BC), a next-state (NS), and output function fields (OF). Once programmed, the branch code (BC) directs the branch control 902 to select an appropriate branch condition. If the selected branch condition is satisfied, the branch control 902 enables the branch multiplexor 904 to select the next-state (NS) address. The selected address is generated by the address generator 904 and provided to the micro instruction word memory 908. Thus, the microsequencer 30 can affect sequences and loops. As micro sequence words 910 are executed, any output function bits are forwarded to an output function generator (not shown) to produce outputs to be applied to the decoder 402.

The foregoing examples illustrate certain exemplary embodiments of the invention from which other embodiments, variations, and modifications will be apparent to those skilled in the art. The invention should therefore not be limited to the particular embodiments discussed above, but rather is defined by the following claims.

What is claimed is:

1. A signal control circuit, comprising:
   a plurality of signal lines forming a data bus;
   a plurality of three-state driver columns connected to said plurality of signal lines, each of said plurality of three-state driver columns including at least one three-state driver; and
   a programmable synchronous three-state control circuit connected to said plurality of three-state driver columns, said programmable synchronous three-state control circuit responding to a control signal and select signals to produce a three-state output enable signal which is selectively applied to said plurality of three-state driver columns to control data signals on said data bus.

2. The signal control circuit of claim 1, wherein at least one column of said plurality of three-state driver columns is enabled by said three-state output enable signal.

3. The signal control circuit of claim 1, wherein at least one three-state driver in a column of said plurality of three-state driver columns is enabled by said three-state output enable signal.

4. The signal control circuit of claim 1, wherein said programmable synchronous three-state control circuit includes programmable logic configured to permit mapping of physical drivers to user defined addresses.

5. The signal control circuit of claim 1, wherein said programmable synchronous three-state control circuit includes at least one programmable sequencer configured to enable complex three-state enable sequences.

6. The signal control circuit of claim 5, wherein said complex three-state enable sequences include consecutive enable sequences.

7. The signal control circuit of claim 1, wherein said programmable synchronous three-state control circuit includes a programmable gate array.

8. The signal control circuit of claim 1, wherein said programmable synchronous three-state control circuit is programmed by said control signal, said control signal including at least one synchronizing and control input.

9. A programmable synchronous three-state control circuit comprising;
    programmable logic configured to permit mapping of physical drivers to user defined addresses, said programmable logic is configured by a control signal including at least one synchronizing and control input,
    wherein said programmable logic includes a programmable sequencer configured to enable complex three-state enable sequences, a decoder, and at least one flip-flop.

10. The programmable synchronous three-state control circuit of claim 9, wherein said complex three-state enable sequences include consecutive enable sequences.

11. A method of selectively enabling signal lines in a signal control circuit, comprising the steps of:
    forming a data bus comprising a plurality of signal lines;
    attaching a plurality of three-state driver columns to said plurality of signal lines, each three-state driver column of said plurality of three-state driver columns including at least one three-state driver; and
    attaching a programmable synchronous three-state control circuit to said plurality of three-state driver columns, said programmable synchronous three-state control circuit responding to a control signal and select signals to produce a three-state output enable signal; and
    applying said three-state output enable signal to selectively enable said plurality of three-state driver columns to control data signals on said data bus.

12. The method of claim 11, wherein at least one column of said plurality of three-state driver columns is enabled by said three-state output enable signal.

13. The method of claim 11, wherein at least one three-state driver in a column of said plurality of three-state driver columns is enabled by said three-state output enable signal.

14. The method of claim 11, further comprising the step of configuring said programmable synchronous three-state control circuit to permit mapping of physical drivers to user defined addresses.

15. The method of claim 11, wherein said programmable synchronous three-state control circuit includes at least one programmable sequencer configured to enable complex three-state enable sequences.

16. The method of claim 11, further comprising the step of programming said programmable synchronous three-state control circuit by said control signal, said control signal including at least one synchronizing and control input.

* * * * *